(12) United States Patent
Huang et al.

(10) Patent No.: US 12,111,189 B2
(45) Date of Patent: Oct. 8, 2024

(54) OBJECT LOCALIZATION AND THREAT CLASSIFICATION FOR OPTICAL CABLE PROTECTION

(71) Applicant: NEC Laboratories America, Inc., Princeton, NJ (US)

(72) Inventors: Ming-Fang Huang, Princeton, NJ (US); Ting Wang, West Windsor, NJ (US); Shaobo Han, Princeton, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/221,822

(22) Filed: Apr. 4, 2021

(65) Prior Publication Data
US 2022/0316921 A1   Oct. 6, 2022

Related U.S. Application Data

(60) Provisional application No. 63/139,059, filed on Jan. 19, 2021, provisional application No. 63/006,140, filed on Apr. 7, 2020.

(51) Int. Cl.
*G01D 5/353* (2006.01)
*G01H 9/00* (2006.01)
*G06V 20/58* (2022.01)
*G08B 21/18* (2006.01)

(52) U.S. Cl.
CPC ......... *G01D 5/353* (2013.01); *G01D 5/35361* (2013.01); *G01D 5/35364* (2013.01); *G01H 9/004* (2013.01); *G06V 20/58* (2022.01); *G08B 21/18* (2013.01)

(58) Field of Classification Search
CPC ............ G01D 5/353; G01D 5/35361; G01D 5/35364; G01H 9/004; G06V 20/58; G08B 21/18; G01V 1/226
See application file for complete search history.

(56) References Cited

U.S. PATENT DOCUMENTS

| | | | |
|---|---|---|---|
| 2012/0226452 A1* | 9/2012 | Hill | G01H 9/004 702/56 |
| 2012/0230629 A1* | 9/2012 | Hill | G01D 5/35348 385/12 |
| 2013/0188177 A1* | 7/2013 | Lovely | G01M 11/33 356/73.1 |
| 2015/0177096 A1* | 6/2015 | Huffman | G01S 17/04 356/73.1 |
| 2020/0190971 A1* | 6/2020 | Thiruvenkatanathan | G01V 1/288 |

FOREIGN PATENT DOCUMENTS

CN  107180521 A  *  9/2017
CN  104568122 B  *  10/2017

OTHER PUBLICATIONS

English machine translation of CN-107180521-A (Year: 2017).*
English machine translation of CN-104568122-B (Year: 2017).*

* cited by examiner

*Primary Examiner* — Dominic J Bologna
(74) *Attorney, Agent, or Firm* — Joseph Kolodka (57) ABSTRACT

Aspects of the present disclosure describe distributed fiber optic sensing (DFOS) systems, methods, and structures that advantageously identify location(s) of construction—or other activities—taking place along fiber optic cable routes that can damage the fiber optic cables.

7 Claims, 6 Drawing Sheets

OBJECT LOCALIZATION AND THREAT CLASSIFICATION FOR OPTICAL CABLE PROTECTION

CROSS REFERENCE

This disclosure claims the benefit of U.S. Provisional Patent Application Ser. No. 63/006,140 filed 7 Apr. 2020 and U.S. Provisional Patent Application Ser. No. 63/139,059 filed Jan. 19, 2021, the entire contents of each is incorporated by reference as if set forth at length herein.

TECHNICAL FIELD

This disclosure relates generally to optical networking and more particularly to using distributed fiber optic sensing (DFOS) techniques to provide object location and threat classification for optical cable protection.

BACKGROUND

As is known, telecommunications carriers have constructed optical fiber infrastructures to support exploding quantities of telecommunications traffic that have become essential to contemporary life. Given this importance—systems, methods, and structures that may continuously monitor and determine threats to such infrastructure to prevent damage thereto would represent a welcome addition to the art.

SUMMARY

An advance in the art is made according to aspects of the present disclosure directed to distributed fiber optic sensing systems (DFOS), methods, and structures that advantageously identify location(s) of construction—or other activities—taking place along fiber optic cable routes that can damage the fiber optic cables.

According to aspects of the present disclosure—and in sharp contrast to the prior art—system, methods, and structures according to aspects of the present disclosure determine location(s) of such construction activities relative to the fiber optic cables and generate alarms and/or notifications such that damage (cuts) to the fiber optic cables may be anticipated and avoided.

Such determination may advantageously occur in real-time, over the same fiber optic facilities for which the damage is to be prevented—even when such facilities are carrying live, telecommunications traffic. These determinations—when coupled with multipoint vibration source training—may advantageously determine vibration source locations with great precision.

Still further, systems, methods, and structures according to aspects of the present disclosure may advantageously employ a threat classifier that continuously monitors the fiber optic facilities and generate alarms when a threat exceeds a predetermined threshold.

BRIEF DESCRIPTION OF THE DRAWING

A more complete understanding of the present disclosure may be realized by reference to the accompanying drawing in which.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DVS (Distributed Vibration Sensor) or DAS (Distributed Acoustic Sensor) interrogator to recover a vibration occurring anywhere along a sensing fiber in equivalent sampling frequency of the pulse repetition rate. For example, for a DVS or DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule. In addition, other sensors in communication with the DFOS may advantageously provide the monitoring of gas molecules as well.

We note further that many millions of miles of fiber optic cable have been deployed worldwide for communication systems—such optical cable may be located within underground conduits, suspended on utility poles etc. Those skilled in the art will understand and appreciate that while most of cables are located underground for long-haul transmission and in cities, fiber cuts and/or breaks remain significantly disruptive for both network operators and customers. As will be understood, when the fiber cut or break occurs, repairs usually require significant operator resources to fix or cure the cut.

One of the most common causes of fiber cuts result from construction activities such as digging in unauthorized locations or installing/pulling new fiber runs near deployed fiber cables. Hence, fiber optic cable cut prevention and early warning system is urgently needed for telecommunications facility owners and service providers.

Those skilled in the art will readily understand that—despite precautionary measures such as the availability of facility maps and pre-digging trace wire flagging—accidental fiber cable cuts remain a common occurrence—resulting from imperfect/out of date maps or unclear cable positioning.

Accordingly, we now describe systems, methods, and structures employing distributed fiber optical sensing (DFOS) techniques to identify construction activity and/or excavator locations such that an early warning of possible fiber optic damage may be provided—thereby preventing cable cut events.

As those skilled in the art will appreciate, construction activities and especially excavator equipment generate vibration signals. Due to a number of factors including underground attenuation, intensity(ies) of vibrations as well as cut-off frequency(ies) reduce as a vibration source (i.e., excavator, other equipment) is further in distance from a fiber cable. Based on this principle, our systems, methods, and structures according to aspects of the present disclosure advantageously determine the position of the excavator by simultaneously examining cut-off frequencies in multiple fiber locations. As we shall show—in most cases—a received signal exhibiting a highest cut-off frequency indicates the closest excavator position to the fiber cable.

Figure 1:
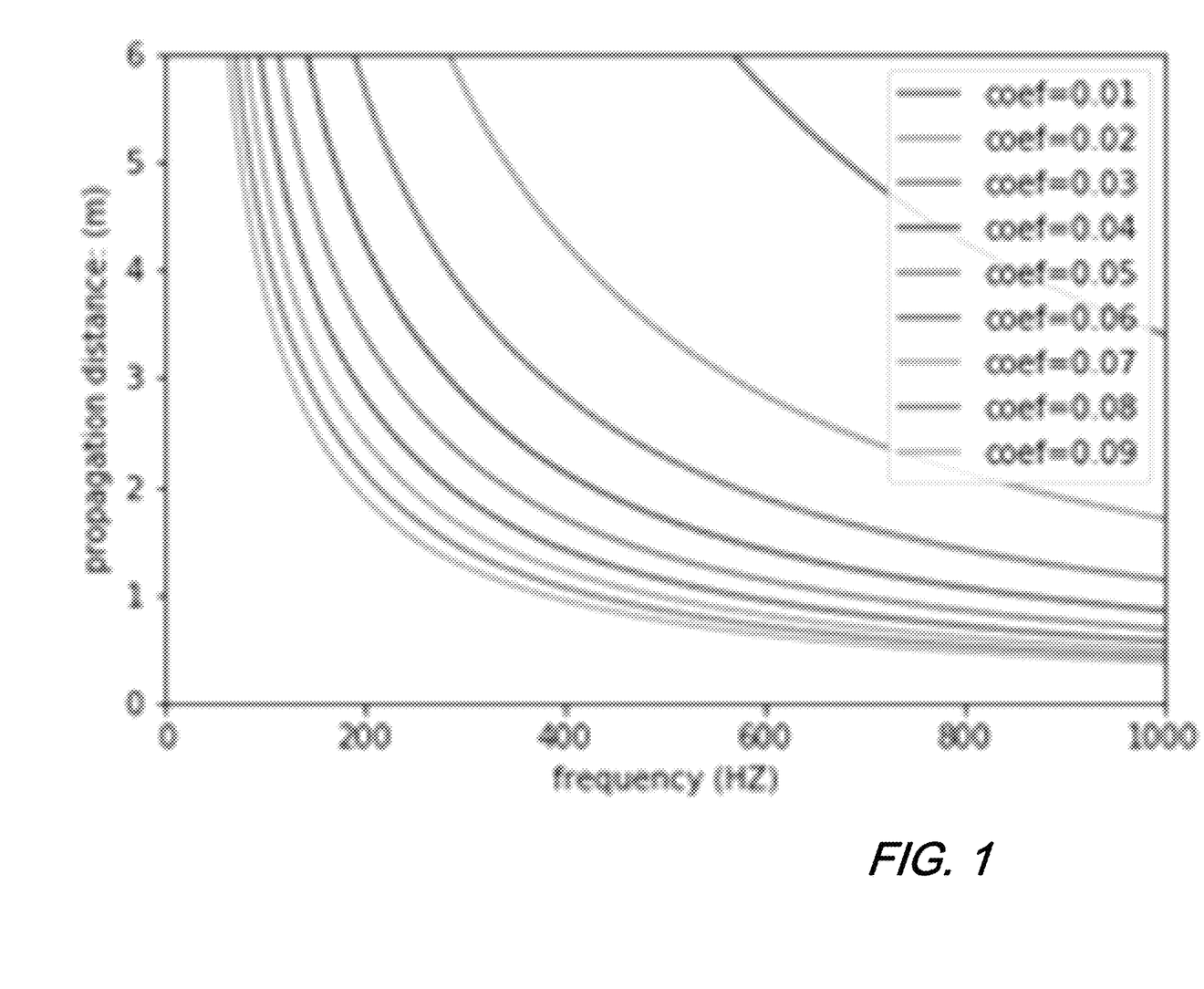
FIG. 1 is a plot illustrating an underground frequency propagation pattern according to aspects of the present disclosure.
Figure 2:
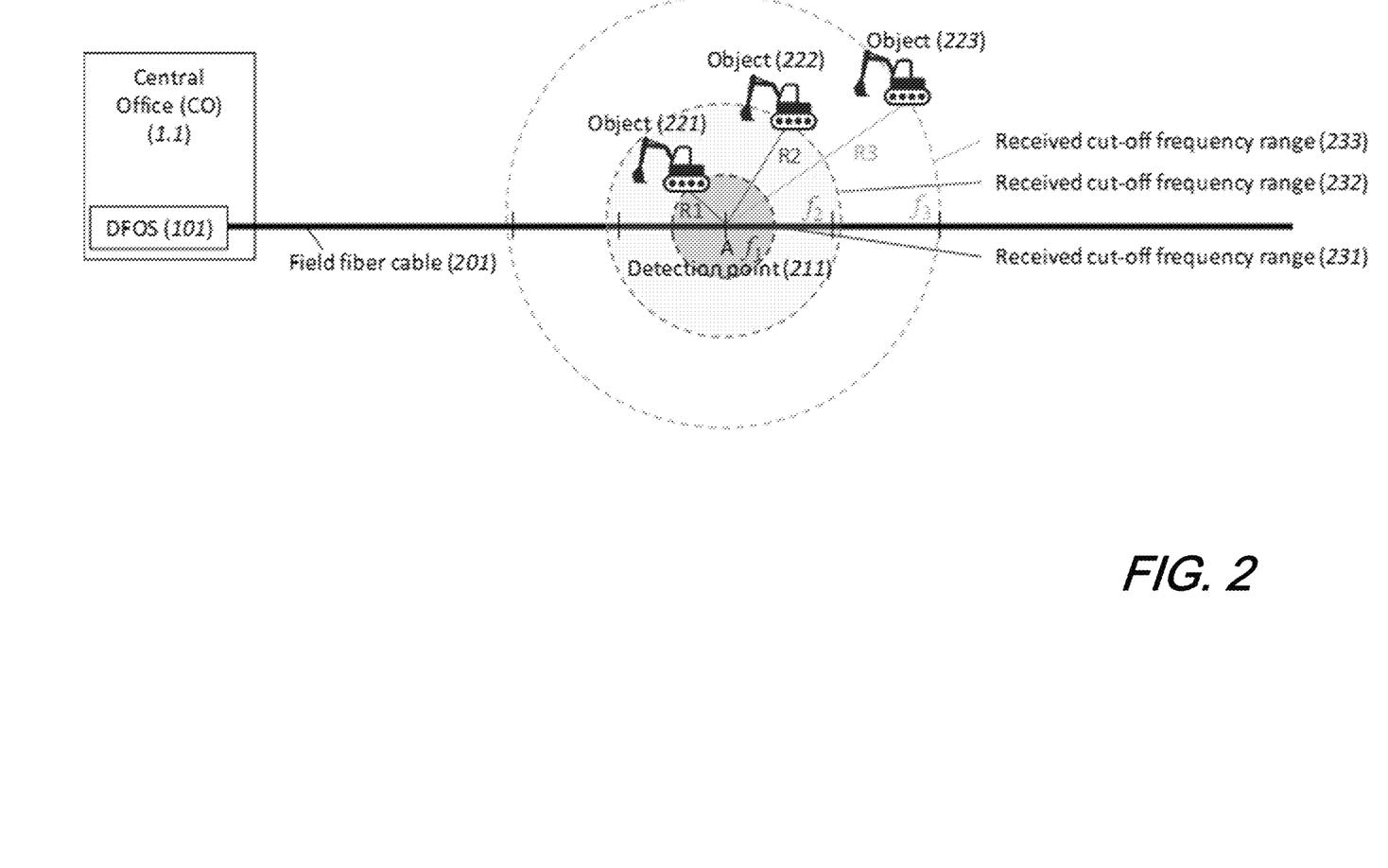
FIG. 2 is a schematic diagram illustrating a frequency diversity method to locate a moving object direction according to aspects of the present disclosure.

FIG. 1 is a plot illustrating an underground frequency propagation pattern according to aspects of the present disclosure. From that figure it may be observed that higher frequency(ies) decay faster during underground propagation event in different soil environments (i.e., different coeff.). Based on these observations, our frequency diversity method to locate object moving directions is shown in FIG. 2 which is a schematic diagram illustrating a frequency diversity method to locate a moving object direction according to aspects of the present disclosure.

As shown in that figure, a distributed fiber optic sensing (DFOS) system (101) is shown positioned in a central office (1.1) and in optical communication with field fiber cable (201) which—as those skilled in the art will appreciate—serves as DFOS sensor for the system and operates in a manner described previously.

As will be further understood, specific technologies employed for the DFOS may include distributed vibration sensing (DVS) or distributed acoustic sensing (DAS)—operating through the same field optical fiber cable (201).

From the figure it may be observed that—in the field—one detection point A (211) is fixed with respect to a same object (i.e. vibration source, excavator, demolition hammer) positioned in different locations (221, 222, 223). The different locations represent different distances (R1, R2 and R3) away from the fiber optic cable.

Figure 3:
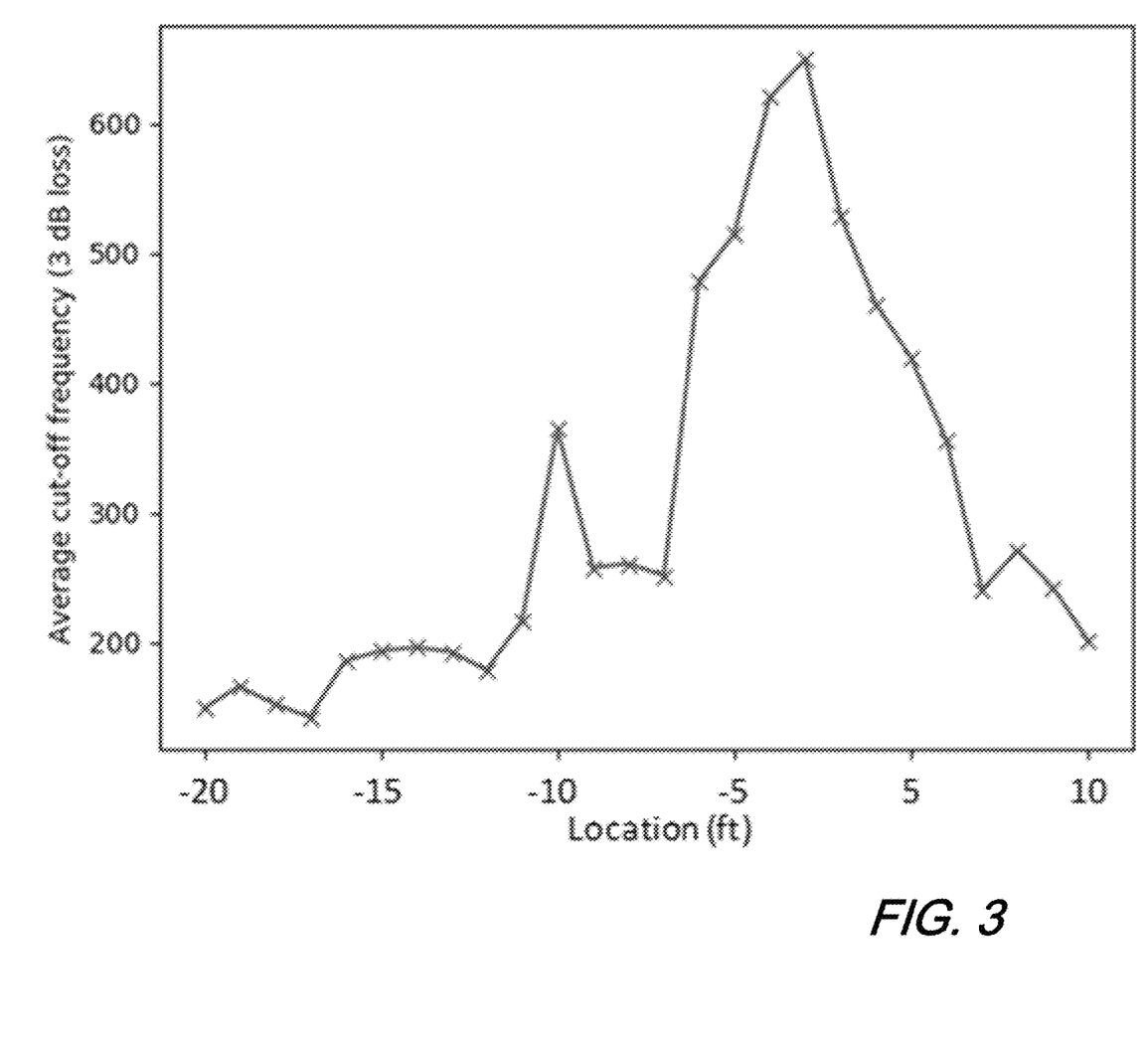
FIG. 3 is a plot illustrating a received cut-off frequency as a function of vibration source position(s) according to aspects of the present disclosure.

FIG. 3 is a plot illustrating a received cut-off frequency as a function of vibration source position(s) according to aspects of the present disclosure. As may be observed from the figure, it can be seen that when a vibration source was physically closer to the fiber optic cable (~0 ft), a higher cut-off frequency (~630 Hz) was observed. Conversely, as a vibration source object is moved physically away from the cable, the observed cut-off frequency is reduced.

Accordingly, the received range of the cut-off frequency can be determined (231, 232, 233) as cut-off frequency of $f_1$ (231)>$f_2$ (232)>$f_3$ (233). As a result, after knowing a construction operation is active near a fiber optic cable, our systems, methods, and structures according to aspects of the present disclosure can advantageously be employed to monitor a moving direction of an object (i.e., as it moves closer to or further from a fiber optic cable) and subsequently provide an early warning alert signal if the object is too close to the cable and a fiber cut becomes possible. In this inventive manner, our systems, methods, and structures may advantageously prevent fiber cuts by such real-time monitoring of objects operating too close to a deployed, fiber optic cable.

Figure 4:
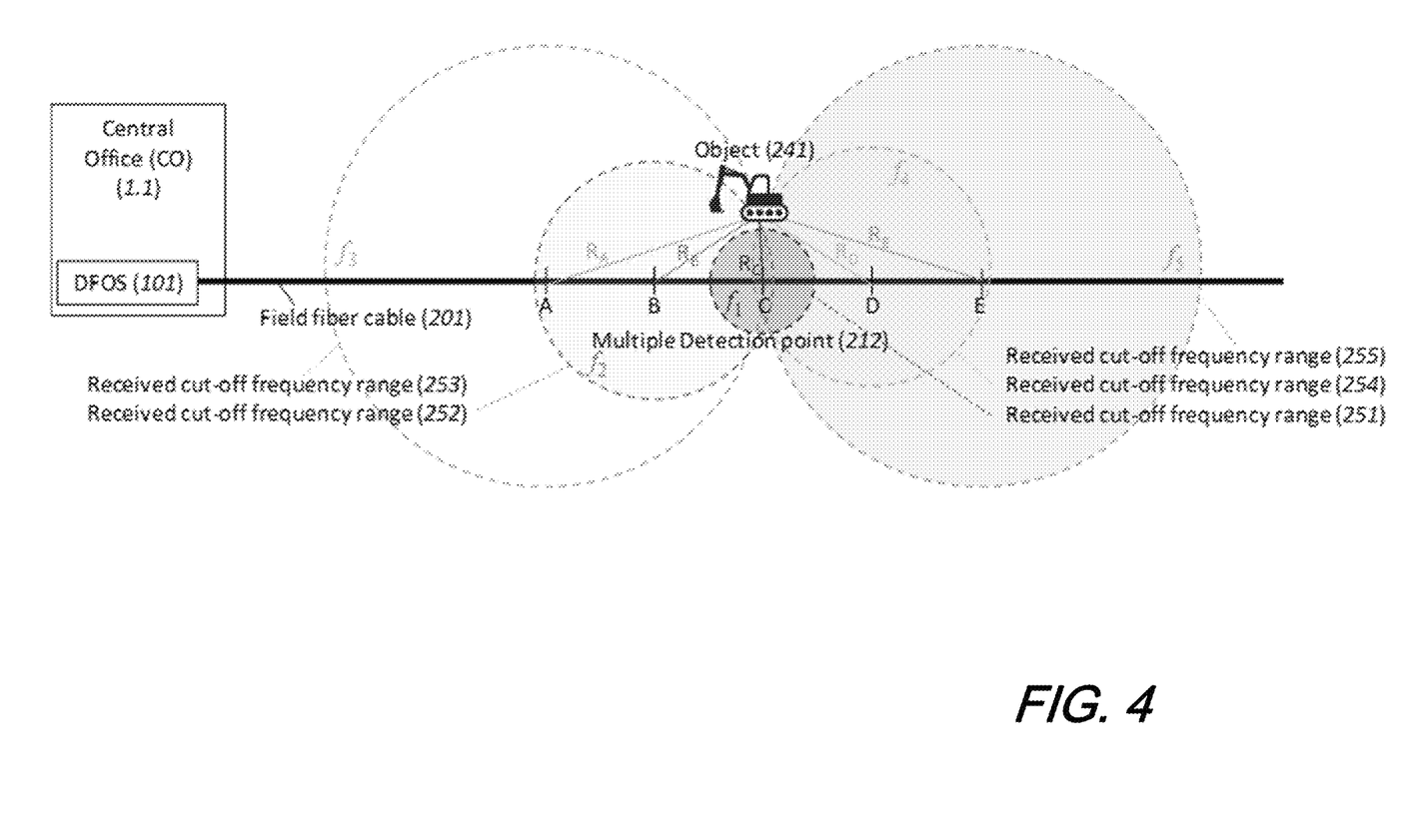
FIG. 4 is a schematic diagram showing an illustrative frequency diversity method to locate object position according to aspects of the present disclosure.

While the ability to detect a physical danger to a deployed fiber optic cable and prevent damage is a significant contribution to the art, our inventive systems, methods, and structures are not so limited. FIG. 4 is a schematic diagram showing an illustrative frequency diversity method to locate object position according to aspects of the present disclosure wherein our systems, methods, and structures may advantageously be employed to locate an object's position.

This object position location operation is similar to the operations described previously however in this operation multiple detection points are determined simultaneously. More specifically, operationally, after ground calibration to determine information about cut-off frequency and distance patterns, an object position can be determined by multiple frequency diversity analyzing.

According to aspects of the present disclosure, when object (241) is operational (working) and generating vibrations, the vibration signals are propagating through the ground to an underground fiber. By utilizing DFOS, multiple detection points (212), namely, A, B, C, D and E, can be realized at the same time. Since the distances between detection points to the object are different (i.e. $R_A$ between A to the object, $R_C$ between C to the object etc.), the received cut-off frequencies are different as well. Based on the cut-off frequency obtained in different detection points (i.e. $f_1$ at C, $f_2$ at B, $f_5$ at E, etc.), the range of object from the fiber optic cable can be determined (251, 252, 253, 254, 255). By coordinating the ranges (circles), a precise location and distance of the object (241) to the fiber optic cable may be determined. We note that while the figure illustrates four detection points, our inventive method and systems need not require that number as more or less may be employed. Usually, 3 points can be used to locate an object successfully.

We now present details and description for object localization and threat classification wherein such localization and classification is provided by a threat classifier.

Figure 5:
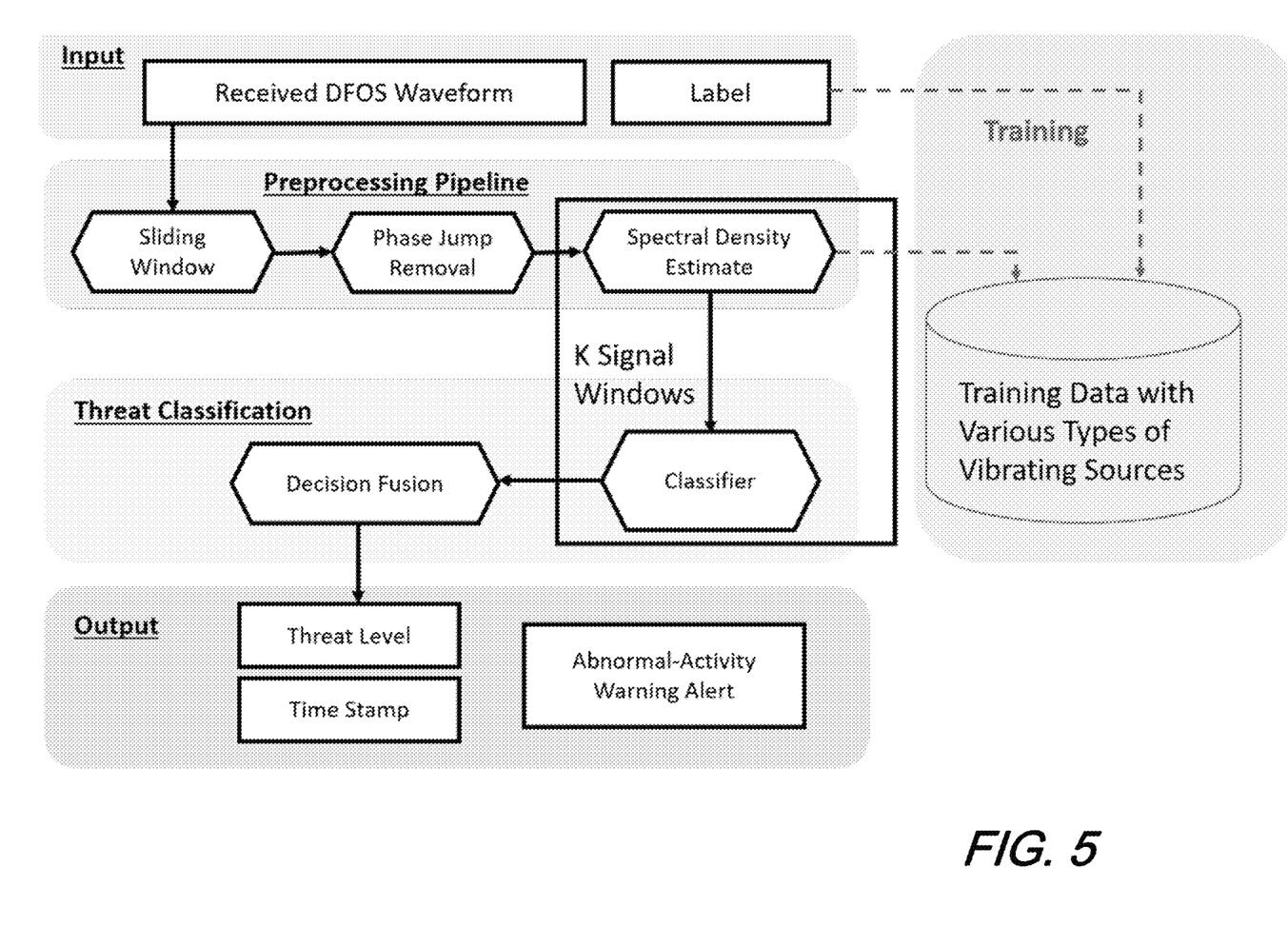
FIG. 5 is a schematic block diagram showing an illustrative threat classifier arrangement including training and inference according to aspects of the present disclosure.

FIG. 5 is a schematic block diagram showing an illustrative threat classifier arrangement including training and inference according to aspects of the present disclosure. As may be observed from that figure, out classifier arrangement includes—in addition to training data—an input section, a pre-processing pipeline, a threat classification section, and an output section.

Input: We note that as previously disclosed, DFOS technology(ies) used herein may include a distributed acoustic sensing (DAS) system wherein an optical pulse train is launched into the fiber optic cable and subsequently measures dynamic strain along a length of the fiber using Rayleigh backscatter signals, producing a characteristic DFOS waveform. Advantageously, a typical DAS system employed may use short optical pulses along with on-chip fast processing to enable an equivalent sensor resolution as small as 1 meter in 2000 Hz sampling rate.

Preprocessing Pipeline: The DFOS waveform is broken into windowed segments of length 4096 having and overlap of 2048. Meanwhile, segments containing phase jumps need to be removed. The time-domain data is converted into frequency domain using Welch's method for spectral density estimation.

Threat classification: The classifier may be trained using all labeled spectrums from different types of vibrating sources. Note that a label is binary, denoting whether vibrating source(s) are inside or outside of a protected range. In a test phase, each windowed segment(s) generate a classification output, and a final decision is made by combining information from multiple windows.

Output: Once a threat level is determined, the classification results are reported (threat, non-threat). If the detected event is classified as threat, an early warning alert is sent with a time-stamp to an appropriate system or person for subsequent action.

At this point we note that in certain regards, systems, methods, and structures according to aspects of the present disclosure may thought of as being generally based on a frequency dependent attenuation mechanism—which we have now validated by three types of vibrating sources in the field namely, a vibrator with continuous vibrations (vibrator-c); a vibrator with intermittent vibrations (vibrator-i); and a vibrator with intermittent vibrations (jackhammer). As those skilled in the art will appreciate, one purpose of using these particular sources is to simulate machine engine noise and pavement breaking vibrations such that an effective validation of our inventive systems, methods, and structures according to aspects of the present disclosure may be made.

Figure 6:
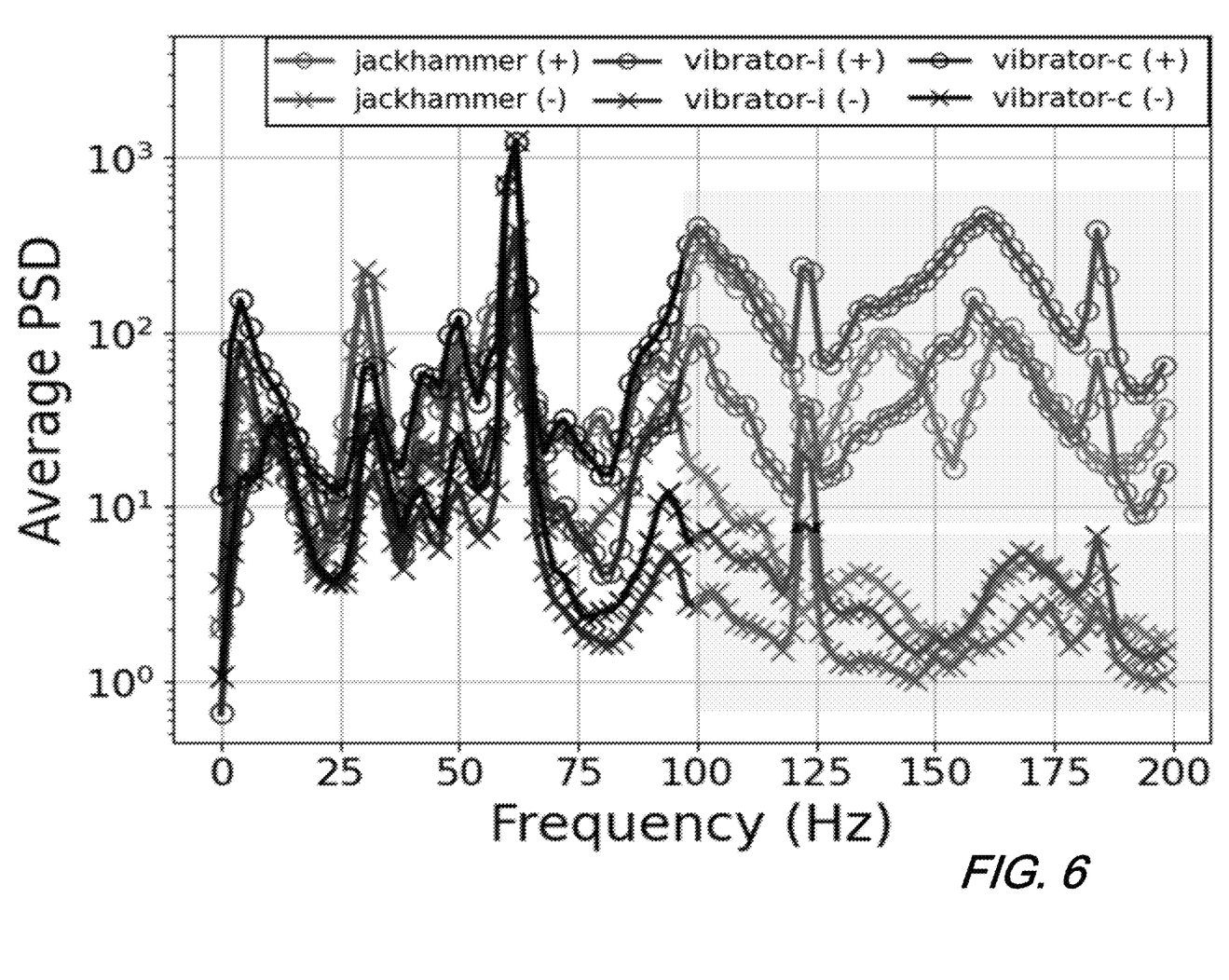
FIG. 6 is a plot showing frequency attenuation phenomenon of different vibrating sources according to aspects of the present disclosure.

FIG. 6 is a plot showing frequency attenuation phenomenon of different vibrating sources according to aspects of the present disclosure. Our experimental evaluation is performed along a route in a metro network near Surf City, NJ which passes through two local offices and ends at a coil of aerial cable having a length of 21 km and includes 4 km aerial cables located at a beginning and an end of the route with 17 km of underground cables located in a middle portion the route. As experimentally evaluated, a DFOS system was located in a remote terminal and one single strand of optical fiber in a cable is employed. As employed, the optical fiber was located inside a 1728 fiber cable having a 2 inch diameter. Most of the underground cable is buried at a depth of 48-60 inches (1.2-1.5 m).

As we determined, our DAS sensor is able to detect distinct patterns in the frequency domain that allows protection radius of 12 ft (3.6 m) in the field. FIG. 6 shows the average power spectral densities (PSD) estimated by Welch's method. Signals of length 4096 are categorized in two groups based on a ground true distance to the cable: 6, 9, and 12 ft (+ positive), and 15~45 ft (– negative). The results show that high frequencies (>60 Hz) decay faster than low frequencies and this distinctiveness at 12 ft as a boundary line holds consistently across all the three vibration modes.

Based on this observation, we trained a linear support vector machine (SVM) classifier jointly on 1206 segments of signal from all the three modes and tested separately on each mode using (non-overlapping) held-out segments. The results are shown in Table 1. Despite the three modes exhibit different signal characteristics in the time domain, the SVM works reasonably well in frequency domain and applies to all the three types of signal sources.

TABLE 1

| | | Signal Source | | |
| --- | --- | --- | --- | --- |
| | | Vibrator-c | Vibrator-i | Jackhammer |
| Metric | Accuracy | 0.968 | 0.934 | 0.971 |
| | Precision | 0.904 | 0.859 | 0.914 |
| | Recall | 0.895 | 0.803 | 0.842 |
| | Support | 599 | 378 | 313 |

At this point, while we have presented this disclosure using some specific examples, those skilled in the art will recognize that our teachings are not so limited. Accordingly, this disclosure should only be limited by the scope of the claims attached hereto.

The invention claimed is:

1. A method of operating a distributed optical fiber sensing system for object localization and threat classification for optical cable protection and early warning, said system comprising:
   a length of optical fiber; and
   a distributed optical fiber sensing interrogator in optical communication with the length of optical fiber;
   said method comprising:
      operating the distributed optical fiber sensing interrogator and detecting, at a detection point along the length of the optical fiber, vibrations produced by a vibration source; and
      determining, a directional movement of the vibration source relative to the detection point by comparing a cut-off vibrational frequency produced by the vibration source at a first time t1 and cut-off vibrational frequency produced by the vibration source at a second time t2;

wherein the cut-off vibrational frequency produced by the vibration source is greater when the vibration source is physically closer to the detection point and a higher vibrational frequency is observed as compared to when the vibration source physically further away from the detection point and a lower vibrational frequency is observed.

2. The method of claim 1 further comprising:

determining a distance from the optical fiber a vibration source is.

3. The method of claim 2 further comprising:

continuously determining the distance from the optical fiber the vibration source is; and generating an alarm when the distance is below a predetermined threshold.

4. The method of claim 3 wherein the alarm is generated when the cut-off frequency reaches a pre-determined threshold.

5. The method of claim 2 wherein a plurality of vibration sources are determined and cut-off frequencies and directional movements relative to a detection point associated with each of the vibration sources are determined.

6. The method of claim 5 further comprising generating location and direction reports for the plurality of vibration sources and sending the reports to an operator.

7. The method of claim 1 wherein the determinations are made using a threat classifier comprising a support vector machine.

\* \* \* \* \*